United States Patent Office 3,294,536
Patented Dec. 27, 1966

3,294,536
PHOTOGRAPHIC PREHARDENER
COMPOSITIONS
Harry C. Baden, Charleton C. Bard, and James Marvin Seemann, all of Rochester, N.Y., assignors to Eastman Kodak Company, Rochester, N.Y., a corporation of New Jersey
No Drawing. Filed Nov. 4, 1963, Ser. No. 321,323
9 Claims. (Cl. 96—50)

This invention relates to photographic prehardener compositions prepared from succinaldehyde (or succinaldehyde precursor), formaldehyde, alkali metal sulfate, alkali metal bromide and a selected reducing agent.

U.S. Patent No. 3,220,849 of Baden and Bard describes prehardener compositions useful for treating photographic products, prior to processing composed of an aqueous solution of succinaldehyde and formaldehyde. It is advantageous in preparing these compositions that they be prepared from a succinaldehyde precursor such as dimethoxytetrahydrofuran or diethoxytetrahydrofuran which is hydrolyzed in aqueous solution at a low pH and then mixed with formaldehyde and other additives. Supplying of the succinaldehyde to the prehardener composition via the precursor offers advantages over using succinaldehyde as such in preparing these prehardening compositions.

In many cases these succinaldehyde-formaldehyde prehardening compositions, particularly those prepared using a succinaldehyde precursor, are prone to produce some precipitate presumably a polymeric dirt, upon standing or after use upon photographic film, which may be sufficiently serious to interfere with use in a continuous process. This dirt can cause spots on the processed film or can plug recirculation line filters and form undesirable coatings on the processing apparatus.

One object of our invention is to provide certain photographic prehardener compositions in which the formation of precipitate or dirt is reduced to a minimum. Another object of our invention is to provide succinaldehyde-formaldehyde prehardening compositions useful in continuous processing operations. A further object of our invention is to prepare succinaldehyde-formaldehyde prehardeners of good properties using a dialkoxy-tetrahydrofuran starting material. Other objects of our invention will appear herein.

We have found that photographic succinaldehyde-formaldehyde prehardening solutions of good characteristics may be obtained when one or a mixture of certain inhibiting materials are incorporated therein.

The prehardening compositions in accordance with our invention are composed of aqueous solutions containing the following:

Succinaldehyde (or its precursor) _____g./l__  0.5–50
Formaldehyde (37% solution) _____ml./l__  1–200
Alkali metal sulfate _____g./l__  100–200
Alkali metal bromide _____g./l__  0–50
pH _____ 2 to 10 plus an inhibiting proportion of a material selected from the following:

Dioxan,
Ascorbic acid,
Acetyl acetone,
The $C_6$–$C_{15}$ aliphatic alcohols,
The aromatic sulfinic acids,
Kojic acid,
The amino aliphatic acids of 2–4 carbon atoms.

Generally these inhibitors will be used in a proportion of 0.1 to 20 grams per liter of prehardener composition. In the case of the aliphatic alcohols, lower proportions have been found to be effective. For instance, concentrations of octyl alcohol down to as low as 0.01 ml./l. have been found useful. In many cases useful proportion has been limited to correspond to the water solubility of the material used.

In preparing prehardener composition using dimethoxy or diethoxy tetrahydrofuran that material is conveniently hydrolyzed to succinaldehyde in all or the greater part of the water employed in preparing the prehardener composition. Hydrolysis proceeds at a practical rate at a pH of less than 3 and a temperature within the range of 25–60° C. The final equilibrium concentration of the DMTF may be down to 1 g. or even 0.1 g./l. After the hydrolysis the various other constituents of the composition are ordinarily supplied although as the rate of hydrolysis is not usually affected by the presence of the other constituents they may be supplied at the beginning providing the pH is maintained below 3 during the hydrolysis operation.

These prehardener compositions can also be used as hardeners anywhere in a process and can be used in black-and-white as well as color processes.

The following examples illustrate the preparation of prehardener compositions in accordance with our invention:

*Example 1*

800 ml. of water at 90° F. was used to dissolve 4.30 ml. of dimethoxytetrahydrofuran, 5.41 ml. of 18 Normal sulfuric acid and 0.5 gram of the sodium salt of paratoluenesulfinic acid. This solution was stirred for 10 minutes at 90° F. whereby the DMTF became hydrolyzed to succinaldehyde. 153 grams of sodium sulfate and 2 grams of sodium bromide were then added and the composition was mixed for 20 minutes. There was then added 20 grams of sodium acetate and 27 ml. of formalin, the volume is then brought to one liter with water and the pH was adjusted to 4.8 at 80° F. The composition prepared was employed as a prehardener for photographic films containing gelatin-silver halide photographic emulsions thereon and was found to be an effective prehardener prior to the processing of the film in the developing baths. This prehardener composition had the unique property of hardening the gelatin emulsion at a low pH and was very effective within the pH range of 4–5.

*Example 2*

A solution was prepared in 800 ml. of water at 90° F. of 2.7 grams of succinaldehyde, 0.5 gram of paratoluenesulfinic acid sodium salt, 5.41 ml. of 18 Normal sulfuric acid, 153 grams of sodium sulfate and 2 grams of sodium bromide. This mixture was mixed for 20 minutes whereupon there was added 20 grams of sodium acetate and 27 ml. of formalin, the volume was then brought to one liter with water, the pH was adjusted to 4.8 at 80° F. and the resulting prehardener composition was used for treating photographic film containing a gelatin-silver halide emulsion layer thereon prior to introducing the film into the developer. Good prehardening effect was obtained and it was found that no polymeric dirt had formed either in the processing of photographic film using the composition of this example or in the processing described in the preceding example.

*Example 3*

A solution was prepared in 600 ml. of water at 90° F. of 0.10 ml. of octyl alcohol, 4.30 ml. of dimethoxytetrahydrofuran, and 5.41 ml. of 18 Normal sulfuric acid. This solution was mixed for ten minutes after which time 153 grams of sodium sulfate and 2.0 grams of sodium bromide were added. The solution was then stirred for 20 minutes, whereupon 20 grams of sodium acetate and 27 ml. of 37% formalin and sufficient water to make the final volume 1 liter were added. The pH was adjusted to 4.80. This solution exhibited a good prehardening effect and could usefully be employed without the build-up of polymeric dirt on the film or apparatus.

Of the inhibiting materials listed the aromatic sulfinic acids have been found to be especially useful. Some acids useful in prehardener compositions are the following: benzene sulfinic acid, para-toluenesulfinic acid, salicyl sulfinic acid, acetamide benzene sulfinic acid, naphthalene sulfinic acid, and chlorbenzene sulfinic acid. Of the aliphatic alcohols octyl alcohol has been found to be especially useful as an inhibiting material although other alcohols within the range of 6–15 carbon atoms are useful in this connection. Of the simple amino acids the representative compound glycine has been found to be particularly effective. The compositions in accordance with our invention have shown themselves to be useful in continuous processes for developing photographic film due to their effectiveness as prehardeners and their freedom from the formation of precipitate or dirt in the prehardening operation.

We claim:

1. A composition which in aqueous solution at a pH within the range of 2–10 is useful as a prehardener composed of the following: a succinaldehyde supplying compound selected from the group consisting of succinaldehyde, 2,5-dimethoxytetrahydrofuran and 2,5-diethoxytetrahydrofuran, formaldehyde, alkali metal sulfate, alkali metal bromide and a compound selected from the group consisting of dioxan, ascorbic acid, acetyl acetone, the $C_0$–$C_{15}$ aliphatic alcohols, the aromatic sulfinic acids, kojic acid, and the amino aliphatic acids of 2–4 carbon atoms.

2. A composition which in aqueuos solution at a pH of 2–10 functions as a prehardener composed of the following: a succinaldehyde supplying compound selected from the group consisting of succinaldehyde, 2,5-dimethoxytetrahydrofuran and 2,5 - diethoxytetrahydrofuran, formaldehyde, alkali metal sulfate, alkali metal bromide and paratoluenesulfinic acid.

3. A composition which in aqueous solution at a pH of 2–10 functions as a prehardener composed of the following: a succinaldehyde supplying compound selected from the group consisting of succinaldehyde, 2,5-dimethoxytetrahydrofuran and 2,5-dimethoxytetrahydrofuran, formaldehyde, alkali metal sulfate, alkali metal bromide and octyl alcohol.

4. A composition which in aqueuos solution at a pH within the range of 2–10 functions as a prehardener composed of the following: succinaldehyde, formaldehyde, alkali metal sulfate, alkali metal bromide and a compound selected from the group consisting of dioxan, ascorbic acid, acetyl acetone, the $C_6$–$C_{15}$ aliphatic alcohols, the aromatic sulfinic acids, kojic acid and the amino aliphatic acids of 2–4 carbon atoms.

5. A prehardening composition comprising an aqueous solution having a pH within the range of 2–10 of the following: freshly prepared succinaldehyde, formaldehyde, sodium sulfate, sodium bromide and paratoluenesulfinic acid.

6. A prehardening composition comprising an aqueous solution having a pH within the range of 2–10 of the following: freshly prepared succinaldehyde, formaldehyde, sodium sulfate, sodium bromide and octyl alcohol.

7. A prehardening composition comprising an aqueous solution having a pH within the range of 2–10 of the following: freshly prepared succinaldehyde, formaldehyde, sodium sulfate, sodium bromide and an aromatic sulfinic acid.

8. A composition of matter comprising a dialkoxytetrahydrofuran selected from the group consisting of 2,5-dimethoxytetrahydrofuran and 2,5-diethoxytetrarydrofuran and an alkali metal salt of an aromatic sulfinic acid.

9. A composition of matter comprising 2,5-dimethoxytetrahydrofuran and the sodium salt of para-toluenesulfinic acid.

References Cited by the Examiner
UNITED STATES PATENTS

| | | | |
|---|---|---|---|
| 2,356,477 | 8/1944 | Staud et al. | 96—16 |
| 2,493,838 | 1/1950 | Terry | 96—50 X |
| 2,585,596 | 2/1952 | Stanton | 96—85 |
| 2,920,081 | 1/1960 | Privette et al. | 260—347.8 |
| 3,220,849 | 11/1965 | Baden et al. | 96—111 |

NORMAN G. TORCHIN, *Primary Examiner.*

C. E. DAVIS, *Assistant Examiner.*